(12) United States Patent
Hiratsuka et al.

(10) Patent No.: US 6,559,908 B2
(45) Date of Patent: May 6, 2003

(54) DIRECT-LIGHT-TYPE PLANAR LIGHT SOURCE APPARATUS AND LIQUID CRYSTAL DISPLAY DEVICE

(75) Inventors: Kohji Hiratsuka, Kawasaki (JP); Fumihisa Hanzawa, Machida (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/076,694

(22) Filed: Feb. 14, 2002

(65) Prior Publication Data

US 2002/0113918 A1 Aug. 22, 2002

(30) Foreign Application Priority Data

Feb. 16, 2001 (JP) ........................................ 2001-039321

(51) Int. Cl.[7] ............................................ G02F 1/1333
(52) U.S. Cl. ...................... 349/58; 349/64; 349/150; 362/368; 362/374
(58) Field of Search ................................ 349/58, 67, 65, 349/60; 362/29, 368, 374, 375

(56) References Cited

U.S. PATENT DOCUMENTS 5,659,376 A * 8/1997 Uehara et al. ................ 349/58

FOREIGN PATENT DOCUMENTS

JP 04-336527 11/1992

* cited by examiner

Primary Examiner—Robert H. Kim
Assistant Examiner—Thoi V Duong
(74) Attorney, Agent, or Firm—Jay H. Anderson

(57) ABSTRACT

A liquid crystal display is described having a front frame, a rear frame and a light source, in which the rear frame and light source may be easily removed from the front frame. The arrangement also permits frame narrowing in the liquid crystal display. A diffusion plate is set between the front frame and the rear frame; lamps are set in the rear frame facing the diffusion plate. Side faces of the front frame and the rear frame are fastened together by removable fasteners.

8 Claims, 3 Drawing Sheets

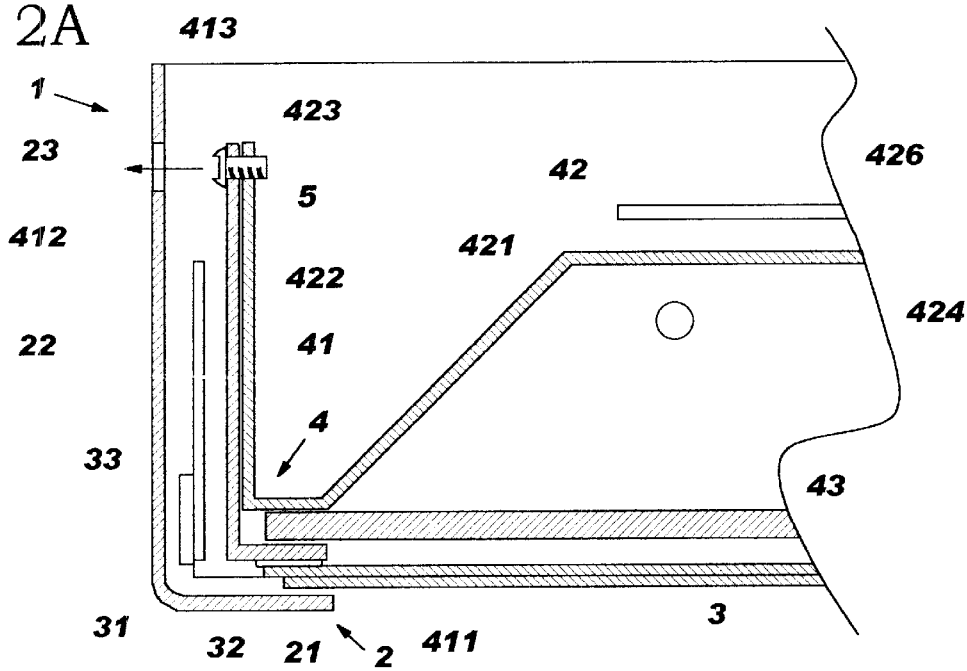
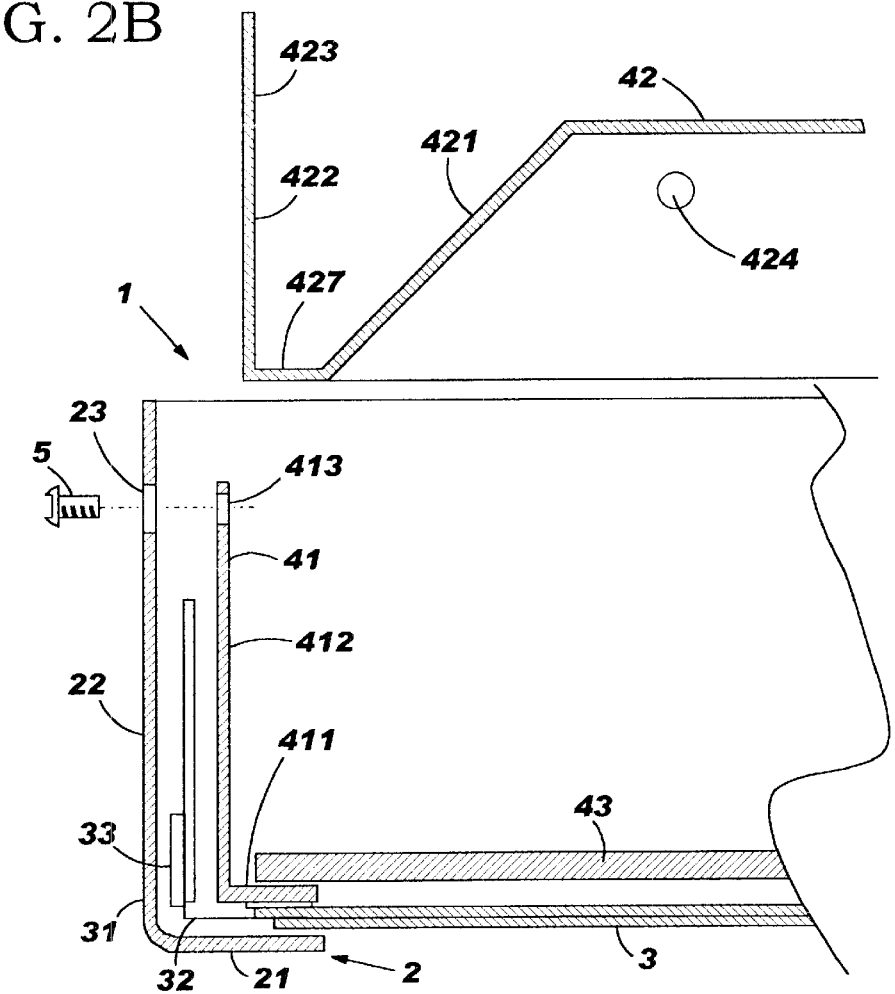

DIRECT-LIGHT-TYPE PLANAR LIGHT SOURCE APPARATUS AND LIQUID CRYSTAL DISPLAY DEVICE

FIELD OF THE INVENTION

The present invention relates to a direct-light-type planar light source apparatus and a liquid crystal display device.

BACKGROUND OF THE INVENTION

Liquid crystal display (LCD) units have been widely used for image display in personal computers and various other monitors. A liquid crystal display generally has a liquid crystal panel provided with a driving circuit and a backlight unit disposed at the back side of the panel. The liquid crystal panel displays an image by controlling the transmitted light of the panel. The liquid crystal panel has a display area configured by a plurality of pixel portions arranged in a matrix and a circumferential area formed on the circumference of the display area.

Two general types of backlight unit in a liquid crystal display are the sidelight type and the direct-light type. In the case of sidelight-type backlight, a light source (cold-cathode tube) is set to one side of a light-guide plate (display face); an advantage of this arrangement is that the backlight unit can be decreased in thickness. However, the sidelight-type backlight has the disadvantage of relatively low brightness.

In the case of a direct-light-type backlight unit, a light source is positioned facing a liquid crystal panel; that is, directly under the liquid crystal panel. Therefore, at the expense of increased unit thickness, it is possible to set a plurality of light sources and thereby increase the brightness. The sidelight-type backlight is mainly used in notebook-type personal computers and the direct-light-type backlight unit is mainly used in stationary displays.

The liquid crystal display disclosed in Published Unexamined Patent Application No. JP4-336527 may be characterized as a conventional liquid crystal display using a direct-light-type backlight unit. This arrangement is shown in FIG. 3. A liquid crystal panel 101 is held by a structure 102, and a diffusion plate 104 and a film 105 are fixed to structure 102. Film 105 has a pattern formed therein for providing a uniform brightness. Fluorescent lamps 103 are fixed opposite structure 102 and a reflection plate 106 is fixed to the structure 102 by a tapping screw so as to cover the fluorescent lamps 103. According to the reference, the fluorescent lamps 103 are replaced by removing the tapping screw and removing only the reflection plate 106 from the structure 102.

The above-noted reference does not disclose any details regarding securing the reflection plate by the tapping screw. However, judging from the configuration in FIG. 3, the tapping screw is screwed in the direction vertical to the liquid crystal panel 101 from the reflection plate 106 toward the structure 102. Because the structure 102 supports the liquid crystal display, it is impossible to secure the tapping screw from the front of the structure 102. This increases operations in the fabrication process of the liquid crystal display and decreases the throughput. In the case of the above-described liquid crystal display, the diffusion plate 104 and film 105 are disposed opposite the reflection plate 106. The reflection plate 106 is fixed to the structure 102 by a screw. Therefore, to secure the reflection plate 106 to the structure 102 and thereafter secure the diffusion plate 104 and film 105 to the structure 102, it is necessary to turn the structure 102 inside out. This operation greatly decreases the fabrication throughput.

Moreover, the trend in LCD equipment design is to further decrease the space between the display area and the four outer edges (frame narrowing). Since the conventional liquid crystal display requires space for fixing screws to the sides of a display face, it may not be possible to design the frame as narrow as desired.

SUMMARY OF THE INVENTION

It is an object of the present invention to provide a backlight unit and a liquid crystal display capable of improving the fabrication throughput. It is another object of the present invention to provide a backlight unit and a liquid crystal display which permits frame narrowing in the liquid crystal display unit.

An important advantage of the present invention is that it permits very efficient assembly of a direct-light-type planar light source apparatus, lamp replacement, and repair of the display unit. Moreover, the present invention permits design of a narrow frame for the unit. Furthermore, in the present invention a liquid crystal display mode is not adversely affected by fine dust attached to a diffusion plate.

According to a first aspect of the invention, a direct-light-type planar light source apparatus is provided which includes a front frame, a rear frame, and a diffusion plate disposed between the front and rear frames. The apparatus has a light source disposed in the rear frame and facing the diffusion plate. Side faces of the front and rear frames are fixed by removable fastening members. The light source is disposed in the inner space of the rear frame and, preferably, the light source is fixed to the rear frame.

According to another aspect of the invention, a direct-light-type planar light source apparatus is provided as described just above, wherein a light source is fixed to the rear frame. The rear frame and front frame have a rear-frame opening and a front-frame opening on their side faces, respectively. A fastening member (a screw) fixes the rear and front frames by passing through the rear- and front-frame openings. The light source and rear frame can be integrally removed from the front frame by removing the screw.

The above-described apparatus may further comprise a plurality of lamps and a lamp holder for holding the lamps. The lamp holder is fixed in the rear frame.

According to an additional aspect of the invention, the rear frame of the apparatus has a first side member and a second side member. The second side member is formed continuously with the first side member and faces the first side member with a predetermined space between the first and second side members. The rear-frame opening has a threaded structure for receiving a screw and is formed on the second side member. The screw is fixed to the rear-frame opening of the second side member.

According to a further aspect of the invention, the direct-light-type planar-light-source apparatus further comprises a circuit board having a power circuit connected to a light source. The circuit board is disposed on the outside surface of the rear frame.

According to another aspect of the invention, a direct-light-type planar light source apparatus is provided as in the first aspect described above, and wherein the inner face of a rear frame reflects the light supplied from the light source.

A liquid crystal display device according to a further aspect of the invention includes a liquid crystal panel having two transparent substrates and liquid crystal material sealed between the two substrates. The device further comprises a bezel disposed on the display face of the liquid crystal panel and a direct-light-type backlight unit disposed on the side opposite to the display face. The direct-light-type backlight unit has a front frame, a rear frame, a diffusion plate disposed between the front and rear frames, and a light source fixed in the rear frame and facing the diffusion plate. The front frame and the rear frame have a front-frame opening and a rear-frame opening on their side faces, respectively. The front and rear frames are fastened to each other by a screw passing through both openings. The light source and the rear frame can be removed together from the front frame by removing the screw. The bezel has a bezel opening on its side face and a screw can be removed through the bezel opening.

The liquid crystal display device described just above may further comprise a tape carrier package (TCP) connected to an end of a liquid crystal panel. The TCP has a film on which a wiring is formed and a driver IC disposed on the film. The film is folded and the driver IC is disposed in a position facing the side face of a rear frame.

BRIEF DESCRIPTION OF THE DRAWINGS

FIG. 2A is a longitudinal sectional view of a part of the liquid crystal display of FIG. 1, showing the rear frame installed.

FIG. 2B is a longitudinal sectional view of a part of the liquid crystal display of FIG. 1, showing the rear frame removed.

DETAILED DESCRIPTION OF A PREFERRED EMBODIMENT

An embodiment of the present invention is described below with reference to the accompanying drawings.

Figure 1:
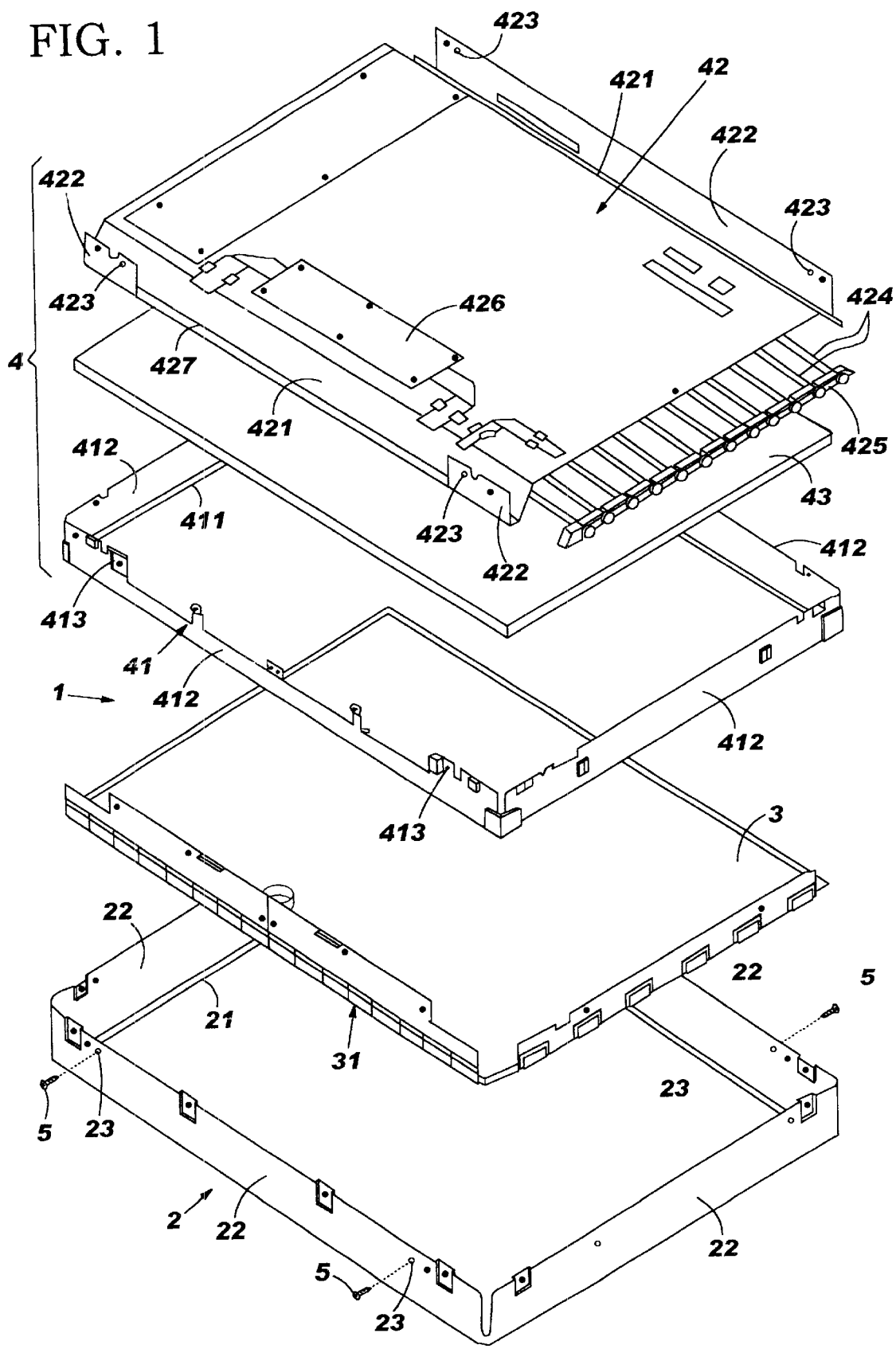
FIG. 1 is a perspective view of a liquid crystal display according to the present invention, showing the separate components thereof.
Figure 3:
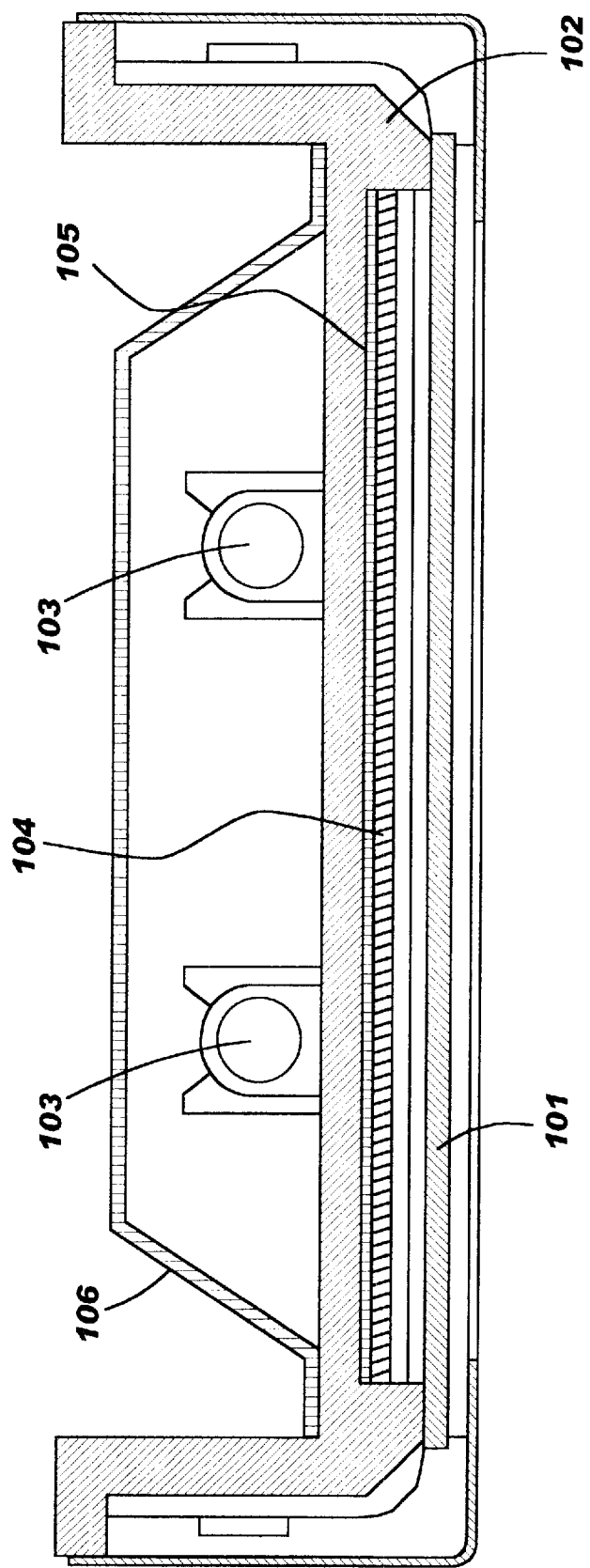
FIG. 3 is a longitudinal sectional view of a conventional liquid crystal display.

FIG. 1 is a perspective view of a liquid crystal display according to the present invention, with the components shown separately from each other.

A liquid crystal display 1 comprises a bezel 2, a liquid crystal panel 3, and a direct-light-type sheet light source (backlight unit) 4. An image is displayed while the liquid crystal panel 3 controls the transmitted quantity of the light emitted from the light emission face of the backlight unit 4.

The bezel 2 is formed of a metal such as stainless steel, in which bezel side faces 22 are vertically formed on four sides of a frame-shaped bezel surface 21 on its circumference. The bezel 2 is almost rectangular when viewed from the image-display face. The four bezel side faces 22 are separate from each other at the corners. A pair of bezel side faces, facing each other and extending in the longitudinal direction, each have two bezel openings 23 through which a screw 5 passes, near each end of the longitudinal side faces 22. A total of four bezel openings 23 are thus formed in the bezel 2. The bezel side faces 22 have several holes in addition to the openings 23.

The backlight unit 4 has a front frame 41 and a rear frame 42. A diffusion plate 43 is disposed between the frames 41 and 42. A plurality of lamps 424 as light sources are disposed in the rear frame 42, facing the back side of the diffusion plate 43. A cold-cathode tube or a hot-cathode tube can be used for the lamps 424. The light emitted from the lamps 424 passes through the diffusion plate 43 and is almost uniformly diffused and emitted from the light emission face of the diffusion plate 43. The diffusion plate 43 is held between the front frame 41 and the rear frame 42. The diffusion plate 43 is made of a resin such as polyethylene terephthalate and has the function of providing uniform brightness of the light emitted from the lamps 424. One or more diffusion sheets can be placed between the front frame 41 and rear frame 42 in addition to the diffusion plate 43. The front frame 41 and the rear frame 42 are formed of a metal such as stainless steel. The diffusion plate 43 may be directly held by the two frames 41, 42; alternatively, an elastic member may be placed between the frames and plate 43.

The front frame 41 has a surface 411 that is substantially rectangular when viewed from the light emission face of the backlight unit 4. Front-frame side faces 412 are formed vertically at four sides of the circumference of the front frame surface 411. A pair of front-frame side faces 412, opposite each other and extending in the longitudinal direction, have front-frame openings 413 near the ends thereof. The front-frame openings 413 are formed at positions almost coinciding with the bezel openings 23.

The rear frame 42 is substantially rectangular when viewed from the light emission face of the backlight unit 4. The light emission face of the rear frame 42 has a large opening and the diffusion plate 43 is placed in the opening. The rear frame 42 has a pair of first side faces (portions) 421 extending in the longitudinal direction and opposite to each other. The first side faces 421 are formed so as to expand outward from the bottom face of the rear frame toward the opening. The side face extending along the shorter edge also forms an opening, which is closed by the side face of the front frame 41 when the liquid crystal display 1 is assembled. The rear frame 42 has second side faces (portions) 422 formed continuously with the first side faces 421. The side faces 422 are formed outside of the side faces 421 and at a predetermined spacing therefrom, so as to face the side faces 421. The side faces 421 and 422 are connected by an intermediate face 427 formed almost parallel to the light emission face.

The side faces 422 are formed so as to be almost vertical to the light emission face of the backlight unit 4 of the diffusion plate 43. The side faces 422 are arranged almost parallel to the front-frame side face 412 and bezel side face 22. As shown in FIG. 1, one side face 422 is divided into two side faces while the other side face is continuously formed as one face. Rear-frame openings 423 are formed near the ends of the side faces 422. Each of the rear-frame openings 423 is formed at a position almost coincident with the front-frame opening 413 when the liquid crystal display 1 is assembled.

The direct-light-type planar light source system 4 includes lamps 424 placed in the rear frame 42 and facing the diffusion plate 43. The lamps 424 typically are cold-cathode tubes, with the ends of each tube fixed to a lamp-holding member 425. A plurality of cold-cathode tubes are used to ensure sufficient brightness. The lamp-holding member 425 is fixed on the inner face of the rear frame 42 by screws. A light-reflecting sheet is stretched on the inner face of the rear frame 42 to effectively reflect the light emitted from the lamps 424 toward the liquid crystal panel. Alternatively, the rear frame 42 may be formed of a reflecting material or coated with a reflecting material. A circuit board 426, for connection to the lamps 424, is provided on the outer face of the rear frame 42, as shown in FIG. 2A. Circuit board 426 includes power circuits such as a DC—DC converter and an inverter circuit. The lamp holder 425 can be fixed to the front frame 41 or formed integrally with the rear frame 42.

The liquid crystal panel 3 has two transparent substrates fixed by a sealant; a liquid crystal material is sealed between the substrates (see FIGS. 2A and 2B). In this embodiment, one of the substrates is an array substrate on which switching elements are arranged in a matrix layout, and the other is a color filter substrate having color filters of RGB Some other types of LCD, such as STN (Super Twisted Nematic), have no switching element. The liquid crystal panel 3 is fixed to the front frame 41 by an elastic double-face adhesive tape. TCPs (Tape Carrier Packages) 31 are connected to two side margins of an array substrate by an ACF (Anisotropic Conductive Film). The TCP 31 has a film 32 on which wiring is formed, and a driver IC 33 positioned on the film 32. The transmitted quantity of light is controlled by a signal output from the driver IC 33. As shown in FIGS. 2A and 2B, film 32 is folded and the driver IC 33 is disposed in a position facing the side face of the rear frame 42. The width of the circumference of the liquid crystal panel 3 is thus reduced, thereby permitting design of a direct-light-type planar light source system with a narrow frame area. It is also possible to dispose the driver IC directly on an array substrate, rather than on a TCP as described above.

FIGS. 2A and 2B are longitudinal sectional views of a part of a direct-light-type planar light source system serving as a backlight unit. FIG. 2A shows a state in which the front frame 41 and rear frame 42 are fixed to each other. FIG. 2B shows a state in which the rear frame 42 has been removed. The liquid crystal display 1 comprises the bezel 2, liquid crystal panel 3, and direct-light-type planar light source apparatus (backlight unit) 4. In these figures, the inner (light-reflecting) face of the rear frame 42 faces downward.

The diffusion plate 43 is disposed between the rear frame 42 and front frame 41 including the lamps 424. As shown in FIG. 2A, the front-frame opening 413 coincides with the rear-frame opening 423 and the screws 5 serving as stops are fixed to the rear-frame openings 423 which are threaded to receive screws 5. The diffusion plate 43 is held by the front-frame surface 411 and an intermediate face 427 formed between side faces of the rear frame. The front-frame opening 413 may or may not be threaded. The front frame 41 and rear frame 42 are fixed to each other by the plurality of screws 5. The rear frame 42 may be easily removed from the front frame 41 in a direction substantially vertical to the light emission face (see FIG. 2B).

The screws 5 are fixed to the second side faces 422 of the rear frame 42. The side faces 422 are formed outside of the first side faces 421 with predetermined spacing. It is noteworthy that no screw openings are formed on the side faces 421 (the bottom surfaces of which reflect the light emitted from the lamps 424), which would reduce the efficiency of the light emission from the lamps 424.

Though screws are used in this embodiment as removable stops, it will be appreciated that other fasteners having the same function may be substituted.

The assembly process of the liquid crystal display 1 includes two steps: the assembly process of the backlight unit 4 and the assembly process of the backlight unit and the liquid crystal panel 3.

To assemble the backlight unit 4, the rear frame 42 is first set with the inner face of the frame 42 upward. The lamp-holding member 425 provided with the lamps 424 is set on the inner face of the rear frame 42 and fixed in the rear frame 42 by the screws 5.

The diffusion plate 43 is then set on the rear frame, and the front frame 41 is set on the diffusion plate 43. The front-frame openings 413 and rear-frame openings 423 are arranged to coincide with each other.

The rear-frame openings 423 have a threaded structure to receive screws 5. The screws 5 are fixed to the rear-frame opening 423 by passing through the front-frame opening 413. The rear frame 42 and front frame 41 are thus fixed together. Because the screws 5 are inserted in a direction substantially parallel with the light emission face of the diffusion plate 43 from the side faces of the frames 41 and 42, it is possible to assemble the backlight unit 4 without turning the unit upside down.

In the assembly process of the liquid crystal panel 3 and backlight unit 4, a double-face adhesive tape (not illustrated) is attached to the front frame 41 and the liquid crystal panel 3 is set on the double-face adhesive tape. The liquid crystal panel 3 and front frame 41 are held together by the double-face adhesive tape. Finally, the bezel 2 is set to cover the liquid crystal panel 3 and the liquid crystal display 1 is completed.

To replace lamps or repair the backlight unit, it is necessary to remove the rear frame 42 from the liquid crystal display 1. By removing the screws 5 from the rear frame 42, the rear frame 42 may be removed. Because the bezel opening 23 on the bezel side face 22, front-frame opening 413, and rear-frame opening 423 are positioned to coincide with each other in an assembled state (see FIG. 2A), it is possible to remove the rear frame 42 together with the lamps 424 simply by removing the screws 5 from the front-frame opening 413 and rear-frame opening 423 through the bezel opening 23 for the replacement of the lamps 424 or other repairs. Because the screws 5 are removable in the direction parallel with the display face of the liquid crystal panel 3, operability is improved. Moreover, because it is unnecessary to remove the diffusion plate 43 for replacement of the lamps 424, dust in the atmosphere does not enter the space between the diffusion plate 43 and the liquid crystal panel 3, so that the liquid crystal panel 3 is not obscured by dust.

The lamps 424 are fixed to the rear frame 42 by the lamp-holding member 425. Lamps may be easily replaced by removing the rear frame 42. Circuit board 426 including an inverter circuit is placed on the outer face of the rear frame 42. Because the lamps 424 and the circuit board 426 are simultaneously removed when removing the rear frame 42, unnecessary operations (such as removing wiring between the lamps 424 and the circuit board 426) are eliminated. Also, because it is unnecessary to connect the lamps 424 with the circuit board 426 through a connector or the like, the number of components is decreased.

While the present invention has been particularly shown and described with reference to a preferred embodiment, it is evident from the foregoing description that numerous alternatives, modifications and variations will be apparent to those skilled in the art. Accordingly, the invention is intended to encompass all such alternatives, modifications and variations which fall within the scope and spirit of the invention and the following claims.

We claim:

1. A direct-light-type planar light source apparatus, comprising:
   a front frame having a pair of facing front side faces extending substantially perpendicular to a front base thereof;
   a rear frame having a pair of facing rear side faces extending substantially perpendicular to a rear base thereof and in a same direction of the pair of facing front side faces, the front and rear side faces substantially parallel with each other;
   a diffusion plate disposed between the front frame and the rear frame; and
   a light source disposed with the rear frame and facing the diffusion plate, wherein corresponding side faces of the front frame and the rear frame are fastened to each other by removable fastening members.

2. The direct-light-type planar light source apparatus according to claim 1, wherein the light source is fixed to the rear frame, the rear frame has rear-frame openings on the rear side faces thereof, the front frame has front-frame openings on the front side faces thereof;

the fastening members are screws through the rear-frame openings and the front-frame openings, and the light source and the rear frame together can be removed from the front frame by removing the screws.

3. The direct-light-type planar light source apparatus according to claim 2, further comprising a plurality of lamps serving as the light source and a lamp holder for holding the lamps, wherein the lamp holder is fixed to an inner face of the rear frame.

4. The direct-light-type planar light source apparatus according to claim 2, wherein the pair of rear side faces includes a first side member and a second side member, said second side member being formed continuously with the first side member and facing said first side member with a predetermined space therebetween, and the rear-frame openings have a threaded structure and are formed on the second side member.

5. The direct-light-type planar light source apparatus according to claim 2, further comprising a circuit board having a power circuit connected to the light source and being disposed on an outer face of the rear frame.

6. The direct-light-type planar light source apparatus according to claim 1, wherein the rear frame has an inner face which reflects light emitted from the light source.

7. A liquid crystal display device, comprising:

a liquid crystal panel having two transparent substrates and liquid crystal material sealed between the substrates;

a bezel disposed on the display face of the liquid crystal panel; and a direct-light-type backlight unit comprising a front frame having a front side face extending substantially perpendicular to a front base thereof, a rear frame having a rear side face extending substantially perpendicular to a rear base thereof and in a same direction of the front side face, the front and rear side faces substantially parallel with each other, a diffusion plate disposed between the front frame and the rear frame, and a light source fixed with the rear frame facing the diffusion plate, wherein the front frame has a front-frame opening on the front side face thereof, the rear frame has a rear-frame opening on the rear side face thereof, the front frame and the rear frame are fastened to each other by a screw through the front-frame opening and the rear-frame opening, the light source and the rear frame are removable together from the front frame by removing the screw, the bezel has a bezel opening on a side face thereof, and the screw is removable through the bezel opening.

8. The liquid crystal display device according to claim 7, wherein the liquid crystal display has a tape carrier package (TCP) connected to an end of the liquid crystal panel, the TCP has a film on which wiring is formed and a driver IC disposed on the film, and the film is folded such that the driver IC is disposed facing and parallel to the front and rear side faces 1.

* * * * *